(12) United States Patent
Wiant et al.

(10) Patent No.: US 10,498,111 B1
(45) Date of Patent: Dec. 3, 2019

(54) BRACE ASSEMBLIES, POWER DISTRIBUTION ASSEMBLIES, AND METHODS

(71) Applicant: Siemens Industry, Inc., Alpharetta, GA (US)

(72) Inventors: Jason P. Wiant, Bedford, TX (US); Russell J. Wedemeyer, Colleyville, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 0 days.

(21) Appl. No.: 16/053,869

(22) Filed: Aug. 3, 2018

(51) Int. Cl.
*H02B 1/32* (2006.01)
*H02B 1/20* (2006.01)
*H02B 1/30* (2006.01)

(52) U.S. Cl.
CPC ............. *H02B 1/202* (2013.01); *H02B 1/305* (2013.01); *H02B 1/32* (2013.01)

(58) Field of Classification Search
CPC ........... H02B 1/202; H02B 1/305; H02B 1/32
USPC ....................................................... 174/70 R
See application file for complete search history.

(56) References Cited

U.S. PATENT DOCUMENTS

| | | | |
|---|---|---|---|
| 6,040,976 A | 3/2000 | Bruner et al. | |
| 6,111,745 A | 8/2000 | Wilkie, II et al. | |
| 6,452,095 B1* | 9/2002 | Perrault | H02G 3/30 174/40 R |
| 6,930,244 B1* | 8/2005 | Nebel | B60R 16/0207 174/486 |
| 7,075,021 B2 | 7/2006 | Rowe et al. | |
| 8,437,118 B2 | 5/2013 | Kasza et al. | |
| 9,144,161 B2 | 9/2015 | Kozuru et al. | |
| 9,608,413 B2* | 3/2017 | Kubota | H02B 1/202 |
| 9,705,294 B2 | 7/2017 | Kubota et al. | |
| 9,768,590 B2* | 9/2017 | Kubota | H02B 1/202 |
| 2014/0118890 A1* | 5/2014 | Kubota | H02B 1/202 361/637 |
| 2019/0044312 A1* | 2/2019 | MacGowan | H02G 3/0406 |

* cited by examiner

*Primary Examiner* — Andargie M Aychillhum
*Assistant Examiner* — Michael F McAllister

(57) ABSTRACT

A cable assembly includes a first cable and a second cable spaced from the first cable. A first brace is coupled between the first cable and the second cable. A second brace is coupled between the first cable and the second cable, wherein the second brace is spaced from the first brace. A link is coupled between the first brace and the second brace. Other cable assemblies, brace assemblies, and methods of bracing cables are disclosed.

18 Claims, 8 Drawing Sheets

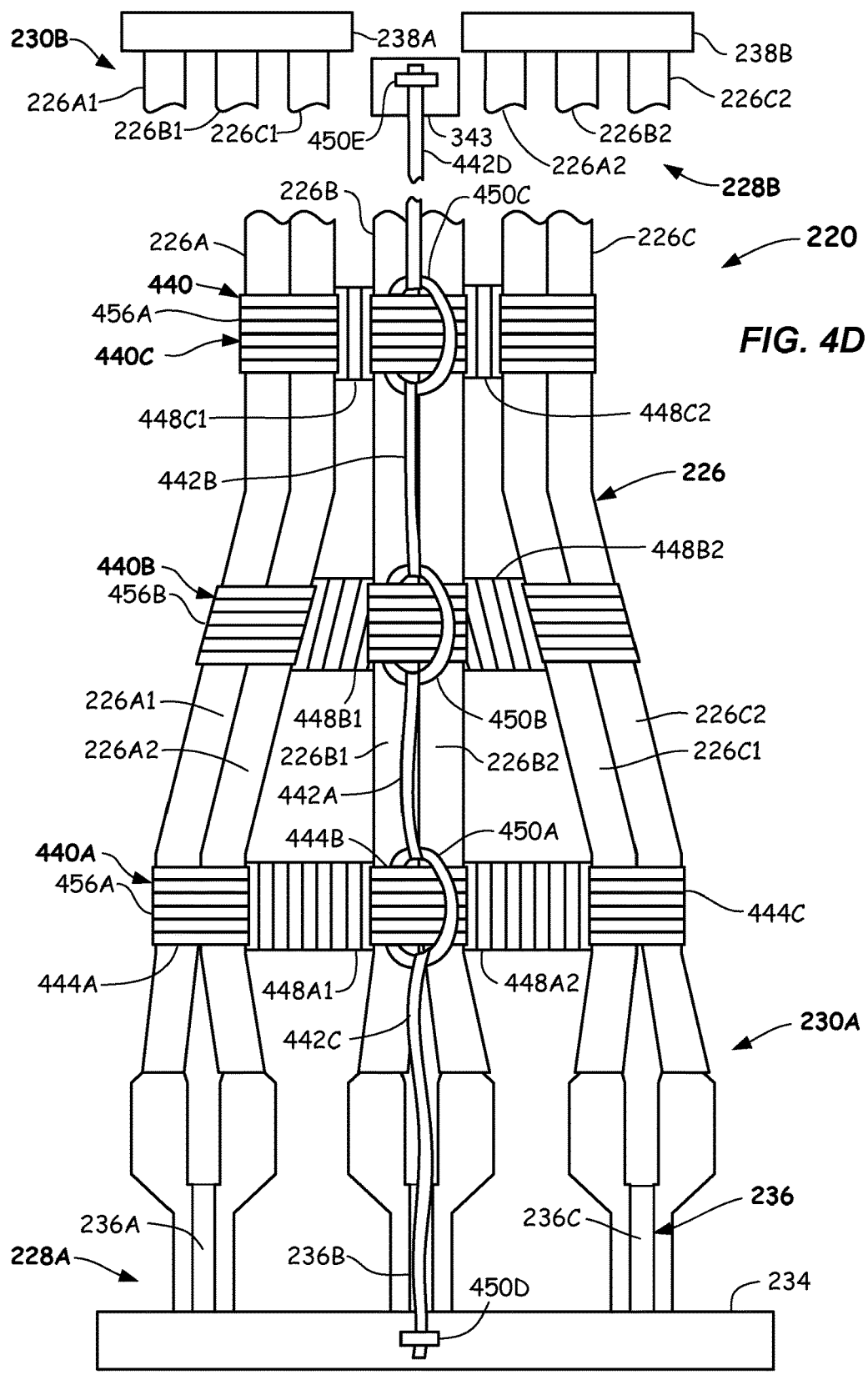

BRACE ASSEMBLIES, POWER DISTRIBUTION ASSEMBLIES, AND METHODS

FIELD

The present disclosure relates to assemblies, systems, and methods for bracing cable assemblies.

BACKGROUND

In power distribution systems (e.g., switchgear and switchboard systems), moving the components as close together as possible minimizes the overall space envelopes of the systems. Such close proximity of the components may place individual cables in cable assemblies in close proximity to one another. The close proximity of the cables to on another may cause movement and/or bending of the cables when large electromagnetic forces are present, such as during short circuit events. If the electromagnetic forces are strong enough, they may bend the cables, which may cause the cables to pull from connectors and possibly cause phase-to-phase contact and/or arcing.

Thus, there is a need for improvements to cable brace assemblies to improve bracing and allow close proximity of the cables relative to one another.

SUMMARY

According to a first aspect, a cable assembly is provided. The cable assembly includes a first cable; a second cable spaced from the first cable; a first brace coupled between the first cable and the second cable; a second brace coupled between the first cable and the second cable, the second brace being spaced from the first brace; and a first link coupled between the first brace and the second brace.

According to another aspect, a cable assembly is provided. The cable assembly includes a first cable; a second cable spaced from the first cable; a first brace comprising: a first rope wrapped around the first cable and the second cable, a second rope wrapped around the first rope in a space between the first cable and the second cable, and a first coupler, wherein at least a portion of the first rope passes through the first coupler. A second brace is spaced from the first brace, the second brace comprises: a third rope wrapped around the first cable and the second cable, a fourth rope wrapped around the third rope in a space between the first cable and the second cable, and a second coupler, wherein at least a portion of the third rope passes through the second coupler. A first link is coupled between the first coupler and the second coupler.

According to another aspect, a method of bracing a plurality of cables is provided. The method includes providing a first cable; providing a second cable spaced from the first cable; wrapping a first rope around the first cable and the second cable at a first location; wrapping a second rope around the first rope in a space between the first cable and the second cable; wrapping a third rope around the first cable and the second cable at a second location, the second location being spaced from the first location; wrapping a fourth rope around the third rope in a space between the first cable and the second cable; and coupling at least one of the first rope and the second rope to at least one of the third rope and the fourth rope.

Still other aspects, features, and advantages of the present disclosure may be readily apparent from the following description by illustrating a number of example embodiments, including the best mode contemplated for carrying out the present disclosure. The present disclosure may also be capable of other and different embodiments, and its details may be modified in various respects, all without departing from the substance and scope of the present disclosure. The disclosure covers all modifications, equivalents, and alternatives falling within the substance and scope of the claims.

BRIEF DESCRIPTION OF DRAWINGS

The drawings, described below, are for illustrative purposes only and are not necessarily drawn to scale. The drawings are not intended to limit the scope of the disclosure in any way. Wherever possible, the same or like reference numbers will be used throughout the drawings to refer to the same or like parts.

FIG. 4D illustrates a plan view of a cable assembly with a completed brace assembly formed from rope according to one or more embodiments.

DETAILED DESCRIPTION

Reference will now be made in detail to the example embodiments of this disclosure, which are illustrated in the accompanying drawings. Power distribution systems, including switchgears and switchboards, may distribute electric power via cables to a plurality of different systems, locations, and devices. For example, an input of a power distribution system may be connected to a main power line, such as the main power line to a building, via cables. The power distribution systems may include circuits and the like that distribute power to a plurality of locations, such as different floors or areas in a building or to different pieces of heavy equipment via cables. The power distribution systems may provide three-phase power to the aforementioned locations via the cables.

Current flow through cables may be several hundred amperes to several thousand amperes or greater, such as during a high circuit events (e.g., short circuit events). The high current flow through the cables, such as during short circuit events, creates very strong electromagnetic forces between the cables. These electromagnetic forces may move or bend the cables, which may cause the cables to contact different voltage potentials and cause further short circuit events, arcing, and other problems. During some high current events, the electromagnetic forces generated by the cables can tear cables from their connectors and cause other damage.

In some embodiments, the power distribution systems may monitor current flow through the cables and may include circuit breakers to disconnect power to cables that draw current in excess of predetermined amperages. For example, some circuit breakers may disconnect power to cables if the current flow through the cables exceeds a predetermined amperage for as little as three cycles. However, the electromagnetic forces generated by the high current flow in the cables may cause the aforementioned damage in as little as three cycles.

Some power distribution systems and/or cable assemblies support the cables to hold them in fixed locations relative to the power distribution systems. During high current events, the supports may prevent the cables from moving. These support systems include many cable supports that tend to be bulky and occupy space, which negatively impacts smaller and more compact power distribution systems.

Cable assemblies including compact braces that prevent movement of cables relative to one another are disclosed herein in FIGS. 1-5.

Figure 1:
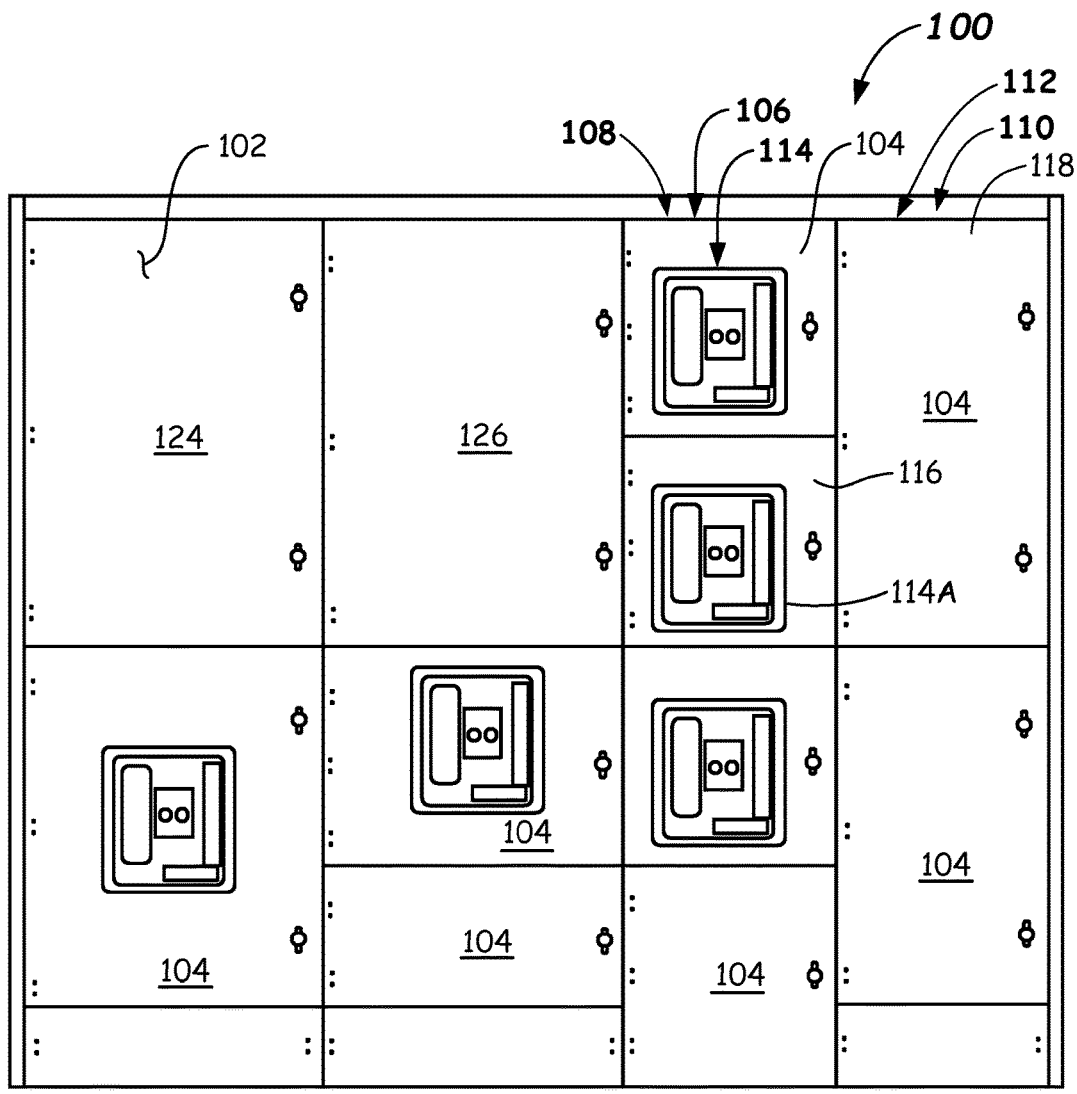
FIG. 1 illustrates a front elevation view of an exterior of a power distribution system (e.g., a switchgear or a switchboard) according to one or more embodiments.

Reference is now made to FIG. 1, which shows a front view of an embodiment of a power distribution system 100. The power distribution system 100 may be a switchgear or a switchboard. The power distribution system 100 may include a front surface 102 including a plurality of panels 104 (a few labeled).

A first plurality of panels 106 may include user interfaces 114, which may include controls, such as circuit breakers and other controllers to control and monitor power distribution to different locations. The components within the first plurality of panels 106 may be collectively referred to as the circuit breaker section 108 and may electrically couple to the user interfaces 114.

A second plurality of panels 110 may contain terminal assemblies, bus assemblies, cables, and the like that electrically connect the power distribution system 100 to locations where power is distributed, such as locations in a building and power equipment. The power distribution system 100 may include a plurality of cables (not shown in FIG. 1) that conduct power between a line source and the power distribution system 100. Other cables, such as cables in a cable pull section 112, may conduct power between the loads, such as floors of a building and electric machines, and the power distribution system 100. The power conducted into and out of the power distribution system 100 may be three phase, relatively low voltage, and high current.

Reference is now made to a panel 116 in the circuit breaker section 108 and a panel 118 in the cable pull section 112, which may be representative of other panels in their respective sections or in the power distribution system 100. The panel 118 may be capable of being opened or removed to enable a user access within the cable pull section 112. Terminal assemblies, which may include lug pads (not shown in FIG. 1), located behind the panel 118 may be electrically connected to the above-described cables that provide power to locations and devices as described above. Thus, a user may access the terminal assemblies from the front of the power distribution system 100. The panel 116 may include a user interface 114A, that can include components such as controls, switches, and circuit breakers, and the like that control and monitor the power distributed via the terminal assemblies located behind the panel 118.

The power distribution system 100 may include cables that couple to a power source, such as line power. For example, these cable may be accessible via a panel 124. Accordingly, a user may access these cables via the front of the power distribution system 100. In some embodiments, a user may also access cables via the rear and/or sides of the power distribution system.

The cables may conduct high current at different phases, which may generate high electromagnetic forces between the cables. The electromagnetic forces are especially great in a power distribution system such as the power distribution system 100 where the components within the power distribution system 100 are in close proximity to each other. Short circuit events through the cables may generate very high electromagnetic forces, which may bend the cables and cause them to break from connectors. In some situations, the broken cables may contact other conductors and cause arcing within the power distribution system 100.

Cable assemblies disclosed herein may include brace assemblies that maintain cables within the cable assemblies in fixed positions relative to each other. Brace assemblies disclosed herein may include components that prevent them from sliding along the cables during high current events, which prevents the above-described problems associated with moving cables. The brace assemblies may include two or more braces coupled together and to support structures to maintain the braces in fixed positions. The brace assemblies disclosed herein may occupy little space within the power distribution system 100 and other systems. Accordingly, the brace assemblies disclosed herein may not interfere with other components within power distribution systems.

Figure 2:
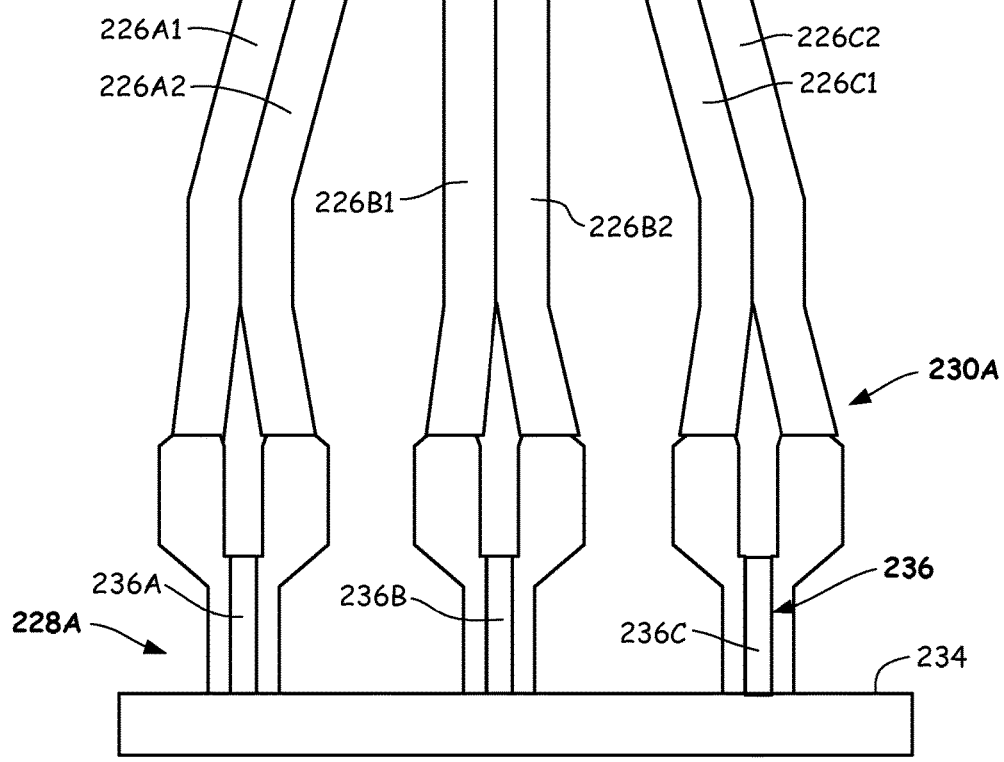
FIG. 2 illustrates a plan view of a cable assembly extending between a first location and a second location according to one or more embodiments.

Reference is made to FIG. 2, which illustrates a plan view of a cable assembly 220 that may include a plurality of cable groups 226. The cable groups 226 may extend between a first location 228A and a second location 228B. The first location 228A may include a lug pad assembly 234 or other cable connection point within the power distribution system 100 (FIG. 1). The second location 228B may include a first conduit 238A and a second conduit 238B. In some embodiments, the second location 228B may include terminals or lugs at a destination location, such as a circuit breaker box within a facility. Both the first location 228A and the second location 228B may include devices or fixed structures that may withstand electromagnetic forces generated by the cable groups 226 during high current events.

The cable assembly 220 may include a plurality of cables and/or a plurality of grouped cables that are spaced from one another. For example, the cable assembly 220 of FIG. 2 may include three cable groups 226 referred to individually as a first cable group 226A, a second cable group 226B, and a third cable group 226C. The first cable group 226A may conduct an A-phase current, the second cable group 226B may conduct a B-phase current, and a third cable group 226C may conduct a C-phase current.

Each of the cable groups 226A-226C may include one or more individual cables or conductors that all conduct the same phase. The conductors or the individual cables within each of the individual cable groups 226A-226C attract to each other during high current events. For example, individual cables in the first cable group 226A attract to one another during high current events. In the embodiment depicted in FIG. 2, the first cable group 226A may include a first cable 226A1 and a second cable 226A2. The second cable group 226B may include a first cable 226B1 and a second cable 226B2. The third cable group 226C may include a first cable 226C1 and a second cable 226C2. The cable groups 226A-226C may each include one or more individual cables.

The cable assembly 220 may include a first end 230A and an opposite second end 230B. The first end 230A of the cable assembly 220 may be affixed to the lug pad assembly 234 at the first location 228A. The lug pad assembly 234 may include a plurality of lug pads 236 that electrically and/or mechanically couple to individual cables in the cable assembly 220 by way of lugs (not shown) or the like. For example, a first lug pad 236A may electrically and mechanically couple to the first cable group 226A, a second lug pad 236B may electrically and mechanically couple to the second cable group 226B, and a third lug pad 236C may electrically and mechanically couple to the third cable group 226C.

The first conduit 238A and the second conduit 238B may receive the cable groups 226A-226C at the second location 228B. In some embodiments the second location 230B may include a lug pad assembly similar to the lug pad assembly 234. In other embodiments, the conduits 238A, 238B may be replaced with a device or devices that support or hold the cable groups 226A-226B. The first conduit 238A may receive three cables having different phases, such as cables 226A1, 226B1, and 226C1. The second conduit 238B may also receive three cables having different phases, such as cables 226A2, 226B2, and 226C2. For example, the cables groups 226A-226C may split prior to being received in the first conduit 238A and the second conduit 238B. The number of conduits may be equal to the number of individual cables in the cable groups.

Figure 3:
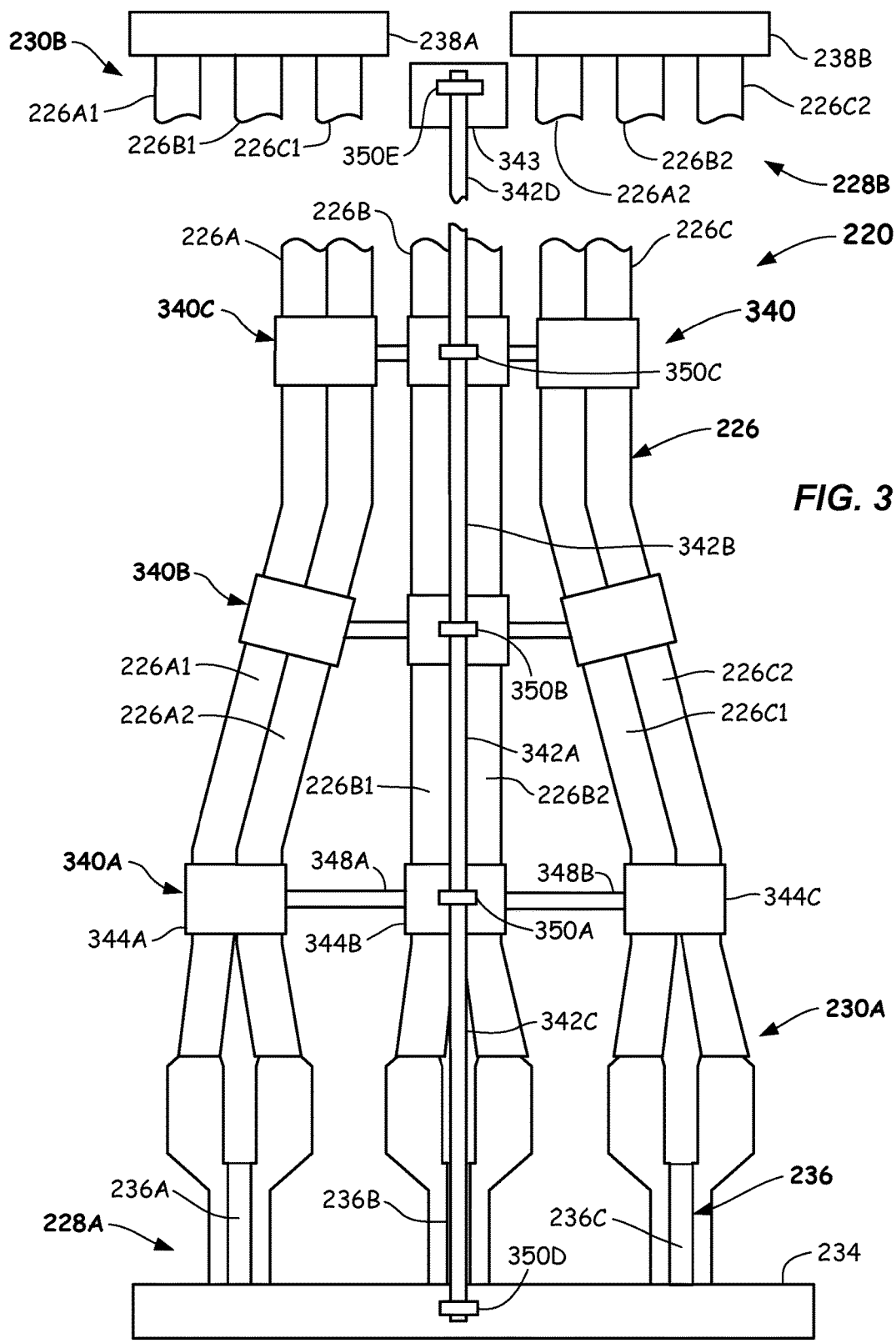
FIG. 3 illustrates a plan view of a cable assembly including a brace assembly that maintains the cables of the cable assembly in fixed locations relative each other according to one or more embodiments.

Reference is now made to FIG. 3, which illustrates a plan view of the cable assembly 220 including a brace assembly 340 that maintains the cable groups 226A-226C in fixed locations relative each other. The brace assembly 340 may also maintain the cable assembly 220 and the cable groups 226 in a fixed location within a structure, such as the power distribution system 100 (FIG. 1). The brace assembly 340 depicted in FIG. 3 may include three braces, a first brace 340A, a second brace 340B and a third brace 340C. The braces 340A-340C may be spaced apart from each other and placed at fixed locations on the cable assembly 220. The brace assembly 340 may include one or more braces.

The braces 340A-340C may be coupled together by links that maintain the braces 340A-340C in fixed locations relative to the cable assembly 220. In the embodiment depicted in FIG. 3, a first link 342A may couple the first brace 340A to the second brace 340B. A second link 342B may couple the second brace 340B to the third brace 340C. A third link 342C may couple the brace assembly 340 to a fixed structure, such as a structure that is fixed relative to the cable assembly 220. In the embodiment of FIG. 3, the third link 342C is coupled to the lug pad assembly 234.

The brace assembly 340 may include a plurality of braces (not shown) between the third brace 340C and the second end 230B. A last link 342D may couple a last brace (not shown) to a cable support device 343, which may couple the brace assembly 340 to the cable support device 343. As shown in FIG. 3, the links 342A-342D may couple the brace assembly 340 between the first location 228A and the second location 228B. The links 342A-342D have been described as individual components. In some embodiments, the links 342A-342D may be a single component, such as a single rigid member, a single semi-rigid member, a continuous length of rope, or the like.

The braces 340A-340C are described with reference to the first brace 340A, which may be representative of all the braces 340A-340C. The first brace 340A may include fasteners wherein a fastener may be affixed to each of the cable groups 226A-226C. For example, a first fastener 344A may wrap around all the cables 226A1 and 226A2 in the first cable group 226A and may secure all the cables 226A1 and 226B2 in the first cable group 226A together. A second fastener 344B may wrap around all the cables 226B1 and 226B2 in the second cable group 226B in the same manner as the first fastener 344A. A third fastener 344C may wrap around all the cables 226C1 and 226C2 in the third cable group 226C in the same manner as the first fastener 344A.

A first member 348A may be coupled between the first fastener 344A and the second fastener 344B. A second member 348B may be coupled between the second fastener 344B and the third fastener 344C. The first member 348A and the second member 348B may keep the cable groups 226A-226C at fixed spaces from each other. In some embodiments, the first member 348A and the second member 348B may be rigid members. One of the fasteners 344A-344C may be coupled to one or both of the links 342A, 342C. A coupler 350A is shown in FIG. 3 coupling the first link 342A and the third link 342C to the second fastener 344B. Other couplers 350B and 350C may couple the first link 342A and the second link 342B to the second brace 340B and the third brace 340C. A fourth coupler 350D may couple the third link 342C to the lug pad assembly 234. A last coupler 350E may couple the last link 342D to the cable support device 343.

The brace assembly 340 may maintain the cable groups 226A-226B in fixed positions relative to each other, even during high current events. The braces 340A-340C may be spaced from each other, the lug pad assembly 234, and the cable support device 343 such that the cables groups 226A-226C will not move significantly or beyond a predetermined distance during high current events. For example, the spacing of the braces 340A-340C may prevent the cables in the cable groups 226A-226C from pulling out from the lug pad assembly 234 and/or the cable support device 343 during high current events. Therefore, the spacing of the braces 340A-340C may be a function of current flow through the cable groups 226A-226C, the proximity of the cable groups 226A-226C to each other, and the stiffness of the cables in the cable groups 226A-226C. Other factors may be used to determine the spacing between the braces 342A-342C. In some embodiments, the braces 340A-340C are spaced approximately 5 inches to 15 inches (12 cm to 38 cm) from each other. In other embodiments, the braces 340A-340C may be spaced approximately six inches (approximately 15 cm) from each other.

The links 342A-342D may prevent the brace assembly 340 from moving along the cables groups 226A-226C when the cable assembly 220 experiences high current events. For example, a high current event may force one or more of the cable groups 226A-226C to twist and/or bend, which may apply a force on the fasteners 344A-344C to move along the lengths of the cable groups 226A-226C. The links 342A-342D may prevent movement of the fasteners 344A-344C and/or the braces 340A-340C under such circumstances. The members 348A, 348B may maintain fixed spaces between the cable groups 226A-226C under normal operating conditions and during high current events. During high current events, the members 348A-348B may prevent the cable groups 226A-226C from moving toward or away from each other.

As described above, the brace assembly 340 may prevent the cable assembly 220 from excessive movement during high current events. The brace assembly 340 may only couple to support devices, such as the lug pad assembly 234 and the cable support device 343, at two locations. As such, the hardware and space requirements of the brace assembly 340 are minimized.

Figure 4A:
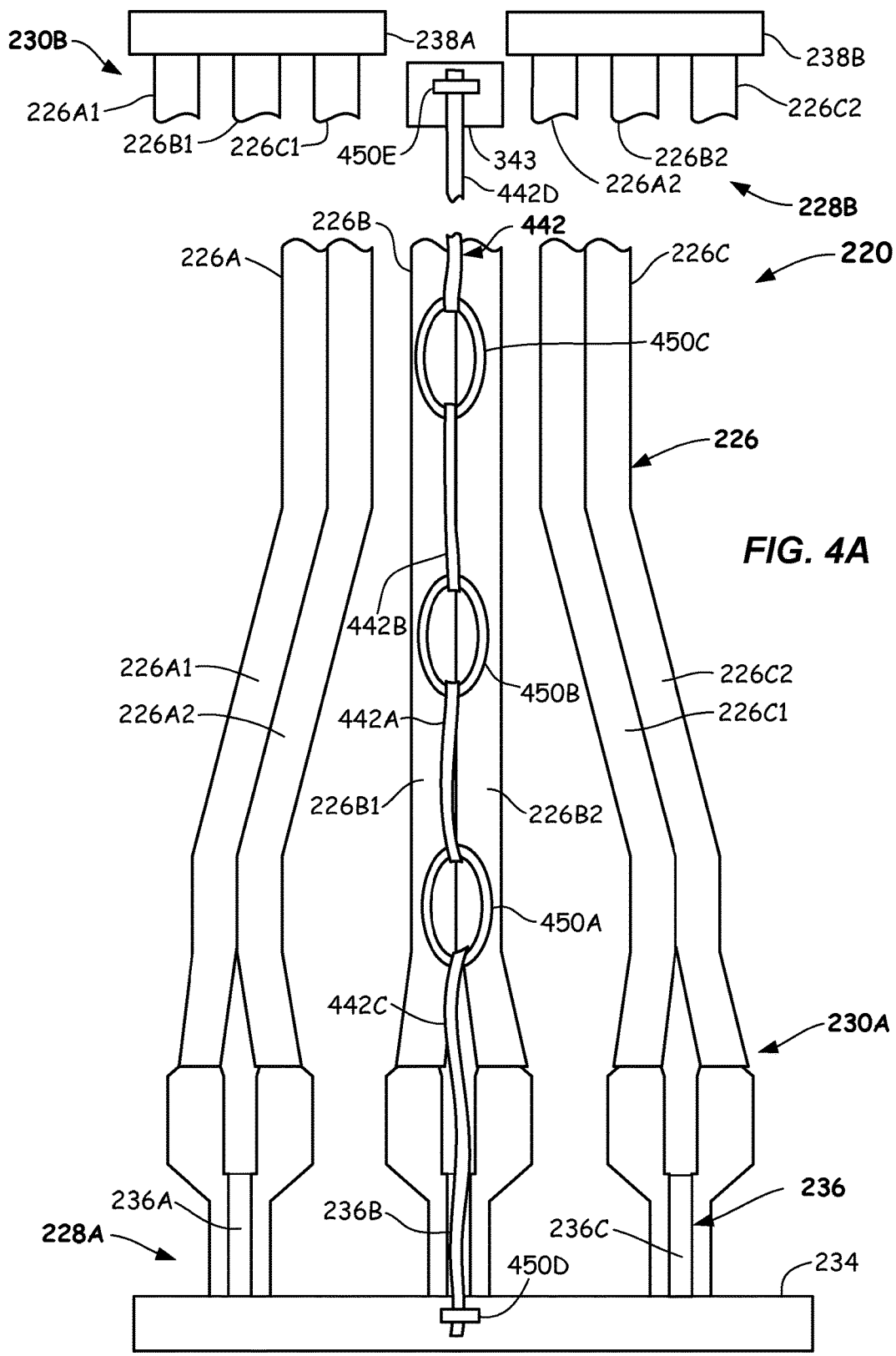
FIG. 4A illustrates a plan view of a cable assembly with a link assembly at least partially attached to the cable assembly according to one or more embodiments.
Figure 4B:
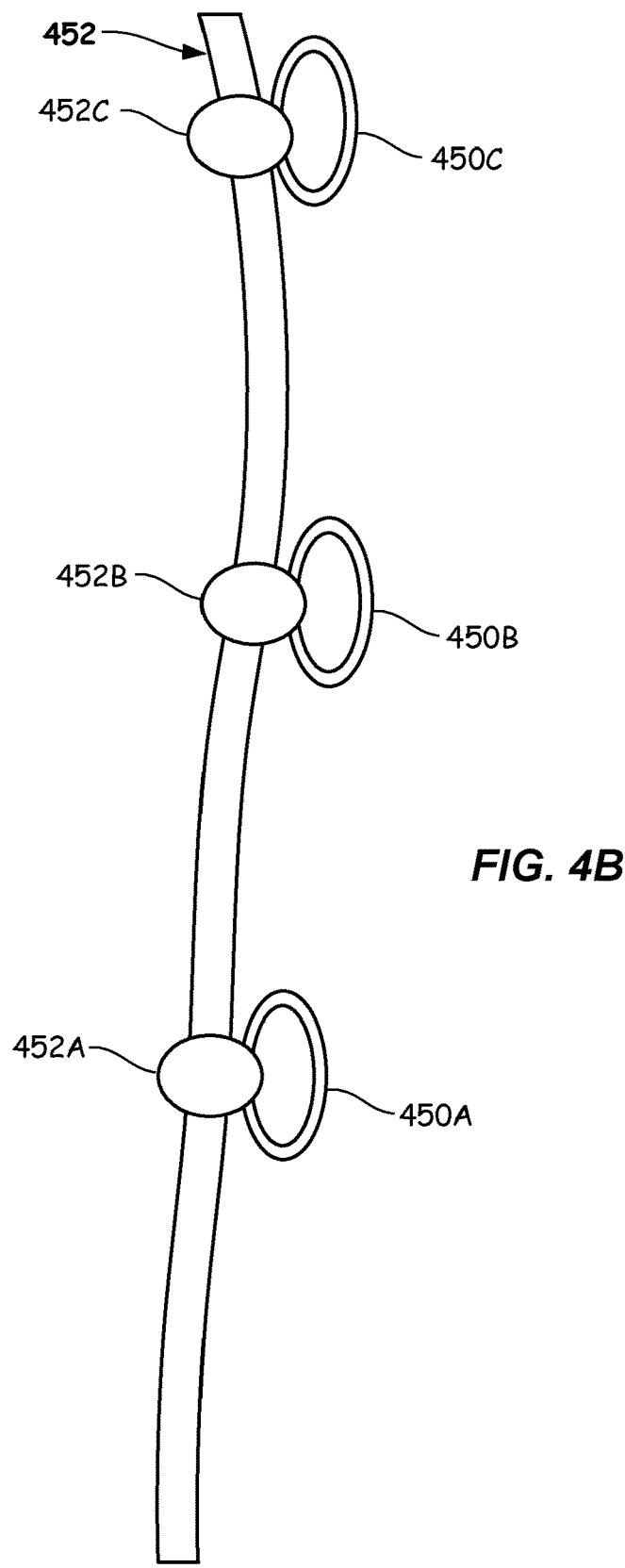
FIG. 4B illustrates an embodiment of a link assembly that may be used with a brace assembly according to one or more embodiments.
Figure 4C:
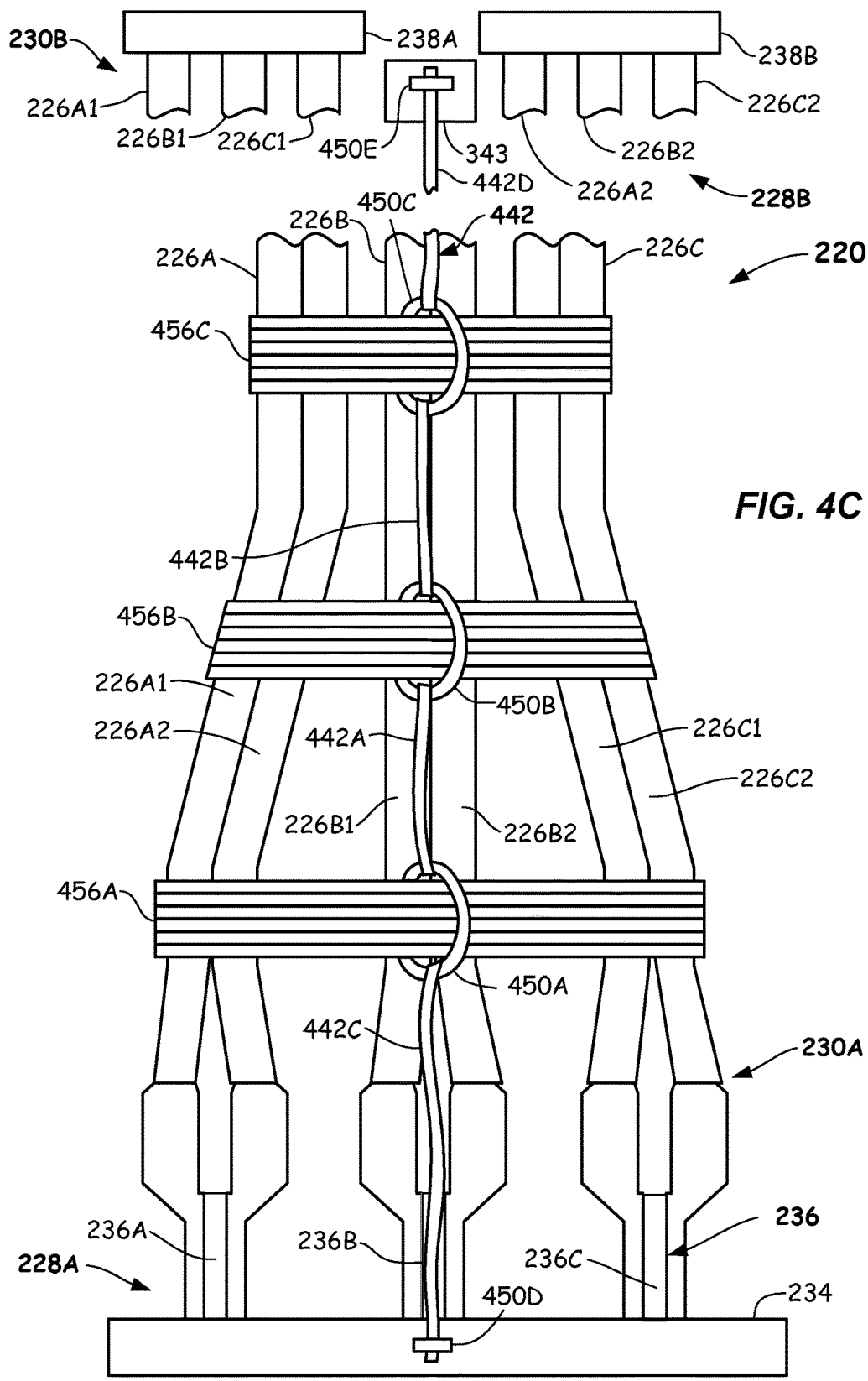
FIG. 4C illustrates a plan view of a cable assembly including fasteners of a partially-formed brace assembly made of ropes according to one or more embodiments.

Brace assemblies and methods of making brace assemblies using flexible cord or rope will now be described with reference to FIGS. 4A-4D. FIG. 4A illustrates a plan view of the cable assembly 220 and a link assembly 442. FIG. 4B illustrates an alternative link assembly 452 that may be used with the brace assembly 440 (FIG. 4D). FIG. 4C illustrates a plan view of the cable assembly 220 with ropes being prepared to be formed into fasteners 444A-444D (FIG. 4D). FIG. 4D illustrates a plan view of the cable assembly 220 with a completed brace assembly 440 formed from rope.

Reference is made to FIG. 4A, which illustrates a first stage in the method of bracing cables or making a brace assembly for cables using a flexible cord or rope. FIG. 4A illustrates a link assembly 442 set proximate the cable assembly 220. The link assembly 442 may be fabricated from a single continuous length of rope or a plurality of ropes. The embodiment of the link assembly 442 depicted in FIG. 4A includes a plurality of links, including a first link 442A, a second link 442B, a third link 442C, and a last link 442D. The first link 442A may join a first coupler 450A and a second coupler 450B. The second link 442B may join the second coupler 450B and a third coupler 450C. The third link 442C may join the first coupler 450A to a fourth coupler 450D. The fourth coupler 450D may join the third link 442C to the lug pad assembly 234. The last link 442D may join the link assembly 442 to the cable support device 343 via a last coupler 450E.

The first coupler 450A, the second coupler 450B, and the third coupler 450C may be loops of rope. In other embodiments, the first coupler 450A, the second coupler 450B, and the third coupler 450C may be rings, such as rigid rings. The fourth coupler 450D and the last coupler 450E may be couplers configured to secure rope to the lug pad assembly 234 and the cable support device 343. In some embodiments, the fourth coupler 350D and the last coupler 450E may include plates that sandwich the rope between the lug pad assembly 234 and the cable support device 343. In other embodiments, the third link 442C and the last link 442D are tied to the lug pad assembly 234 and/or the cable support device 343 and the fourth coupler 450D and/or the last coupler 450E may not be present.

Additional reference is now made to FIG. 4B, which illustrates another embodiment of a link assembly 452 that may be used in place of the link assembly 442 (FIG. 4A). The link assembly 452 may be made from a continuous length of rope. One or more knots (illustrated as ovals) may be tied to secure the couplers 450A-450C to the link assembly 452. For example, a first knot 452A may couple the link assembly 452 to the first coupler 450A, a second knot 452B may couple the link assembly 452 to the second coupler 450B, and a third knot 452C may couple the link assembly 452 to the third coupler 450C. In other embodiments, the knots 452A-452C may form loops in the rope that constitute the couplers 450A-450C.

Referring to FIG. 4C, after the link assembly 442 is in place, other ropes or the like may be used to form structures similar to the fasteners 344A-344C (FIG. 3) and the members 348A-348B. First rope 456A may be wrapped around the cable assembly 220 proximate the first coupler 450A. As shown in FIG. 4C at least a portion of the first rope 456A may pass through the first coupler 450A. At least a portion of a second rope 456B may pass through the second coupler 450B and at least a portion of a third rope 456C may pass through the third coupler 450C. As shown in FIG. 4C, the ropes 456A-456C may be wrapped several times around the cable groups 226A-226C of the cable assembly 220. For example the ropes 456A-456C may be wrapped several times around the outermost cable groups (e.g., the first cable group 226A and the third cable group 226C) of the cable assembly 220.

Reference is now made to FIG. 4D where additional ropes are illustrated wrapped around the ropes 456A-456C to form braces 440A-440C and the complete brace assembly 440. A first brace 440A may be formed by wrapping rope 448A1 and rope 448A2 transversally around the first rope 456A in spaces between the cable groups 226A-226C. When the rope 448A1 and the rope 448A2 are tightly wrapped around the first rope 456A, they may function as the members 348A, 348B (FIG. 3). For example, by tightening the rope 448A1 and the rope 448A2, they tighten the first rope 456A between the cable groups 226A-226B such that the first rope 456A may be rigid or semi-rigid. The first rope 456A in combination with the rope 448A1 and the rope 448A2 may maintain the cable groups 226A-226C at predetermined spaces from each other, even during high-current events where strong electromagnetic forces are generated. The same mechanism may be applied to the second rope 456B by ropes 448B1 and 448B2 to form a second brace 440B. The same mechanism may also be applied to the third rope 456C by ropes 448C1 and 448C2 to form the third brace 440C.

Referring to the first brace 440A, in addition to forming rigid or semi-rigid members, the ropes 448A1-448C2 form fasteners 444A, 444B, and 444C around the cable groups 226A-226C. For example, as the rope 448A1 and the rope 448A2 are tightened, a first fastener 444A tightens around the first cable group 226A, a second fastener 444B tightens around the second cable group 226B, and a third fastener 444C tightens around the third cable group 226C. The same mechanism may be applied to the second brace 440B and the third brace 440C. It is noted that the spaces between the cable groups 226A-226B may not be constant. Thus, the ropes 448A1 and 448A2 may be longer to fill a larger space than the ropes 448B1 and 448B2.

Figure 5:
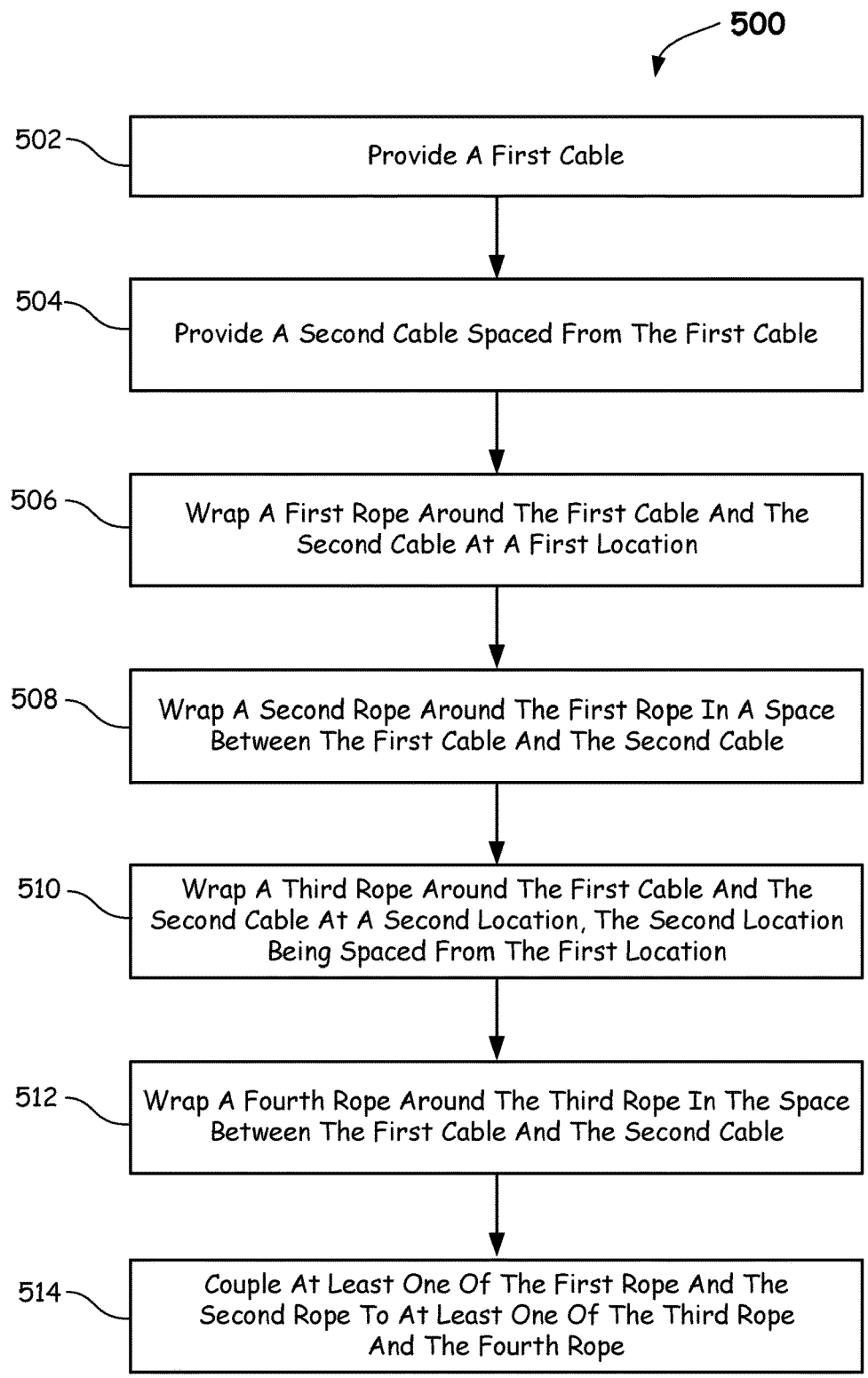
FIG. 5 illustrates a flowchart describing a method of bracing a plurality of cables by forming a brace assembly made of rope according to one or more embodiments.

In another aspect, a method of bracing a plurality of cables (e.g., cables 226A1-226C2) is provided as shown by the flowchart 500 of FIG. 5. The method, in 502, may include providing a first cable (e.g., cable 226A1). The method, in 504, may include providing a second cable (e.g., second cable 226B2) spaced from the first cable. The method, in 506, may include wrapping a first rope (e.g., first rope 456A) around the first cable and the second cable at a first location. The method, in 508, may include wrapping a second rope (e.g., rope 448A1) around the first rope in the space between the first cable and the second cable. The method may include, in 510, wrapping a third rope (e.g., second rope 456B) around the first cable and the second cable at a second location, the second location being spaced from the first location. The method, at 512, may include wrapping a fourth rope (e.g., rope 448B1) around the third rope in the space between the first cable and the second cable. The method may include, at 514, coupling at least one of the first rope and the second rope to at least one of the third rope and the fourth rope.

It should be readily appreciated that the present disclosure is susceptible of broad utility and application. Many embodiments and adaptations of the present disclosure other than those herein described, as well as many variations, modifications, and equivalent arrangements, will be apparent from, or reasonably suggested by, the present disclosure and the foregoing description thereof, without departing from the substance or scope of the present disclosure. Accordingly, while the present disclosure has been described herein in detail in relation to specific embodiments, it is to be understood that this disclosure is only illustrative and presents examples of the present disclosure and is made merely for purposes of providing a full and enabling disclosure. This disclosure is not intended to be limiting to the particular apparatus, assemblies, systems and/or methods disclosed, but, to the contrary, the intention is to cover all modifications, equivalents, and alternatives falling within the scope of the claims.

What is claimed is:

1. A cable assembly, comprising:
   a first cable;
   a second cable spaced from the first cable;
   a first brace coupled between the first cable and the second cable;
   a second brace coupled between the first cable and the second cable, the second brace being spaced from the first brace; and
   a first link coupled between the first brace and the second brace, wherein the first brace comprises:
      a first rope wrapped between the first cable and the second cable and spanning a space between the first cable and the second cable; and
      a second rope wrapped around the first rope in the space between the first cable and the second cable.

2. The cable assembly of claim 1, wherein the first cable comprises a first plurality of cables and wherein the second cable comprises a second plurality of cables, and wherein the first brace comprises:
   a first fastener fastening the first plurality of cables together; and
   a second fastener fastening the second plurality of cables together.

3. The cable assembly of claim 2, wherein the first link is coupled to the first fastener.

4. The cable assembly of claim 2, further comprising a member coupled between the first fastener and the second fastener.

5. The cable assembly of claim 1, wherein first cable and the second cable are coupled to a lug pad assembly.

6. The cable assembly of claim 5, further comprising a cable coupling device wherein the second brace is coupled to the cable coupling device.

7. The cable assembly of claim 1, wherein the first link comprises a loop and wherein at least a portion of the first rope passes through the loop.

8. The cable assembly of claim 1, wherein the first link comprises a third rope coupled between the first brace and the second brace.

9. The cable assembly of claim 1, further comprising a third cable, wherein the first brace is coupled between the first cable, the second cable, and the third cable, and wherein the second brace is coupled between the first cable, the second cable, and the third cable.

10. A method of providing a cable assembly, comprising:
    providing a first cable;
    providing a second cable spaced from the first cable;
    providing a first brace coupled between the first cable and the second cable;
    providing a second brace coupled between the first cable and the second cable, the second brace being spaced from the first brace; and
    providing a first link coupled between the first brace and the second brace, wherein the first brace comprises:
       a first rope wrapped between the first cable and the second cable and spanning a space between the first cable and the second cable; and
       a second rope wrapped around the first rope in the space between the first cable and the second cable.

11. The method of claim 1, wherein the first cable comprises a first plurality of cables and wherein the second cable comprises a second plurality of cables, and wherein the first brace comprises:
    a first fastener fastening the first plurality of cables together; and
    a second fastener fastening the second plurality of cables together.

12. The method of claim 11, wherein the first link is coupled to the first fastener.

13. The method of claim 11, further comprising:
    providing a member coupled between the first fastener and the second fastener.

14. The method of claim 10, wherein first cable and the second cable are coupled to a lug pad assembly.

15. The method of claim 14, further comprising:
    providing a cable coupling device wherein the second brace is coupled to the cable coupling device.

16. The method of claim 10, wherein the first link comprises a loop and wherein at least a portion of the first rope passes through the loop.

17. The method of claim 10, wherein the first link comprises a third rope coupled between the first brace and the second brace.

18. The method of claim 1, further comprising:
    providing a third cable, wherein the first brace is coupled between the first cable, the second cable, and the third cable, and wherein the second brace is coupled between the first cable, the second cable, and the third cable.

* * * * *